United States Patent Office 3,503,948
Patented Mar. 31, 1970

3,503,948
SPHERICAL POLYMER PARTICLES
Harold A. Walters, Beverton, and Donald S. Morehouse, Midland, Mich., assignors to The Dow Chemical Company, Midland, Mich., a corporation of Delaware
No Drawing. Filed Oct. 4, 1965, Ser. No. 492,918
Int. Cl. C08f *3/02, 7/02;* C08d *3/04*
U.S. Cl. 260—94.9          8 Claims

ABSTRACT OF THE DISCLOSURE

Small spherical beads of thermoplastic material, such as polyethylene, are made by heating chopped fibers of plastic above its melting point while suspended in a non-solvent liquid.

---

The present invention relates to a method for producing small spherical particles of solid thermoplastic polymers.

The preparation of powdered polymer by grinding the polymer is expensive and not entirely satisfactory because it is limited to producing relatively coarse particles greater than about 300 microns and the particles are rough and irregular.

The preparation of fine polymer particles by precipitating a dissolved polymer from a solvent system with addition of non-solvent or by cooling or evaporation is not only expensive but prduces particles which are porous in nature. Such porous particles are highly undesirable when employed, for example, in molding processes.

In accordance with the present invention, spherical non-porous polymer particles are produced by a process which comprises (1) mixing together a thermoplastic polymer in the form of pieces of fine fiber and dispersing medium therefor, said dispersing medium being a polymer wetting agent, having a boiling point higher than the melting point of the polymer and being non-solvent for the polymer, (2) heating the resulting mixture to a temperature above the melting point of the polymer fiber, said mixture being agitated at a rate sufficient to prevent agglomeration of the polymer particles while keeping the dispersing medium in the liquid phase, and (3) cooling the mixture while continuing agitation to produce a suspension of the resulting particulate, spherical, non-porous polymer product.

The polymer fibers that may be employed in the present invention are made, for example, by the method as described in U.S. Patent 3,097,085. Polymers that may be employed in making the fibers for use in the process of the invention are thermoplastic polymers such as polyethylene, polypropylene, polystyrene, copolymers of ethylene and ethyl acrylate, styrene and butyl acrylate, methyl methacrylate and ethyl acrylate, alpha-methylstyrene and 2-ethylhexyl acrylate and the like. The starting polymer fiber has a diameter of from about 2 to about 50 microns and preferably from about 5 to about 25 microns. The fibers are cut or chopped into pieces such that the spherical particles made therefrom preferably have diameters less than about 600 microns.

The dispersing media employed in the present invention comprise aqueous and non-aqueous media that sufficiently wet the surface of the polymer fibers during the strring and heating process to prevent agglomeration of the polymer particles. Aqueous solutions of any of the known wetting agents or surface active agents may be used in the process of the invention. Examples include sodium dodecyl diphenyloxide disulfonate, sodium stearate, sodium lauryl sulfate, or synthetic wetting, or dispersing agents such as water-soluble alkali salts of sulfonated polystyrene, sulfonated polyvinyltoluene, polyacrylic acid, polymethacrylic acid and the like. It is preferred that the concentration of the wetting agent in the aqueous mixture be such that the measured surface tension of the mixture is equal to or less than 35 dynes per centimeter. Therefore, it is desirable that the wetting agent be present in the aqueous mixture in an amount of from about .015 to about 1 percent by weight based on the total weight of the mixture and such aqueous media are preferred.

Non-aqueous, non-solvent dispersing media that may be employed in practicing the invention include diphenyl oxide, polydimethyl siloxane, nonyl-phenyl ether of polyethylene glycol, diethanol amine, octyl alcohol and the like.

The temperatures employed in the process should be above the crystalline melting point of the polymer yet low enough to avoid degradation of the polymer. Generally, temperatures of 100° C. to about 180° C. are sufficient to form the spherical polymer particles.

Where the dispersing medium is a solution of a wetting agent in water or other medium having a normal boiling point below the temperature necessary to melt the thermoplastic polymer, pressure is applied to the vessel containing the polymer-dispersing medium mixture to raise the boiling point of the solution and keep the dispersing medium in the liquid phase.

The spherical particles of the invention can be used for static or fluidized dip coating, spraying, dusting and flame spraying applications as well as for preparing stable polymer dispersions in water or some other medium for use in roller, dip or spray coating. They may be additionally used in the preparation of heat resistant coatings and in the preparation of molded or formed shapes, particularly by means of a rotational molding process.

The following examples are illustrative of the invention and are not intended to limit the scope thereof.

EXAMPLE 1

A 500 g. portion of aqueous solution of sodium dodecyl diphenyloxide disulfonate (0.1 percent by weight in water) and 5.0 g. of polyethylene fibers (5–35 microns in diameter) were mixed together in a Waring blendor for a period of 5 minutes. A 100 g. portion of the above mixture was placed into a glass citrate bottle together with 100 g. of the above-described solution of sodium dodecyl diphenyloxide disulfonate in water. A magnetic stirrer was placed into the bottle and the bottle sealed with a bottle cap and placed on a magnetic stirring hot plate. The mixture was heated to a temperature of about 115° C. while stirring was continued at a rate of about 100 r.p.m. for a period of two minutes. The heat was then turned off and the mixture cooled to a temperature of about 90° C., the stirring action being continued during the cooling period.

The contents of the bottle was poured into a No. 100 U.S. Standard Sieve separating the beads from the liquid dispersing medium. The beads were washed with water and dried. The resulting product was a mass of finely divided solid, spherical beads having a size of about 400 microns in diameter.

EXAMPLE 2

The procedure of Example 1 was substantially repeated except that diethanol amine was substituted for the aqueous solution of sodium dodecyl diphenyl oxide disulfonate of Example 1. Polymer beads were obtained which had a size of from about 200 to 300 microns in diameter.

EXAMPLE 3

A 500 g. portion of an adduct of nonyl phenol and about 9 moles of ethylene oxide and 5.0 g. of polyethylene fibers (5–35 microns in diameter) were mixed together in a Waring blendor for five minutes. A 100 g. portion of the above mixture was placed into a glass citrate bottle together with 100 g. of octyl alcohol. The bottle was capped and heated to 115° C. while the mixture was subjected to constant stirring as in Example 1. The bottle and contents were cooled to about 90° C. while stirring was continued. The resulting beads were collected as in Example 1.

EXAMPLE 4

In place of the polyethylene fibers used in the foregoing examples there are used fibers of other thermoplastic polymers as hereinbefore described, such as fibers of a copolymer of ethylene and 20 percent ethyl acrylate, with substantially the same results in forming small solid spherical beads of such polymers.

What is claimed is:

1. A process for producing finely divided, spherical, solid polymer beads which comprises (1) making a suspension of a thermoplastic polymer in the form of fine fibers in a non-solvent liquid dispersing medium therefor, such medium being a wetting agent for the polymer, with the proviso that when such medium is an aqueous medium it has a surface tension of not more than about 35 dynes per centimeter, said fibers having diameter of from about 5 to about 35 microns, (2) heating the resulting suspension to a temperature above the crystalline melting point of the thermoplastic polymer and agitating said suspension to prevent agglomeration of the resulting polymer beads and (3) cooling the suspension while agitation is continued.

2. The process according to claim 1 wherein the thermoplastic polymer is polyethylene.

3. The process according to claim 1 wherein the dispersing medium comprises a solution of sodium dodecyl diphenyloxide disulfonate in water.

4. The process according to claim 1 wherein the dispersing medium is diethanol amine.

5. The process according to claim 1 wherein the dispersing medium is the adduct of nonyl-phenol and ethylene oxide.

6. A process according to claim 1 which comprises (1) making a suspension of (a) polyethylene fibers having a diameter of from about 5 to about 35 microns in (b) a non-solvent aqueous dispersing medium comprising at least .015 percent by weight of sodium dodecyl diphenyloxide disulfonate in water, (2) heating the resulting suspension to a temperature of about 115° C., while subjecting the suspension to agitation and to pressure sufficient to keep the dispersing medium in a liquid phase and (3) cooling the resulting suspension of polyethylene beads in dispersing medium while continuing the agitation.

7. A process for producing finely divided, spherical, solid polymer beads which comprises (1) making a suspension of a thermoplastic polymer in the form of fine fibers in a non-solvent aqueous liquid dispersing medium therefor, such medium containing sufficient wetting agent to provide said medium with a surface tension of not more than about 35 dynes per centimeter, said fibers having diameter of from about 5 to about 35 microns, (2) heating the resulting suspension to a temperature above the crystalline melting point of the thermoplastic polymer and agitating said suspension to prevent agglomeration of the resulting polymer beads and (3) cooling the suspension while agitation is continued.

8. The process according to claim 7 wherein the thermoplastic polymer is polyethylene.

References Cited

UNITED STATES PATENTS 2,831,846   4/1958   Edmonson et al.

FOREIGN PATENTS 242,750   1/1963   Australia.

SAMUEL H. BLECH, Primary Examiner
W. J. BRIGGS, Sr., Assistant Examiner

U.S. Cl. X.R.

260—29.6, 32.6, 33.2, 33.4, 34.2, 86.1, 86.7, 93.5, 93.7